US012713206B2

(12) United States Patent
Mizes et al.

(10) Patent No.: US 12,713,206 B2
(45) Date of Patent: Aug. 18, 2026

(54) METHOD AND SYSTEM FOR IMPROVING LOCATION DETERMINATION FOR STATIONARY USER EQUIPMENT IN A CELLULAR NETWORK

(71) Applicant: VERIZON PATENT AND LICENSING INC., Basking Ridge, NJ (US)

(72) Inventors: Howard Mizes, Salem, SC (US); Basavaraj Sharana Patil, Concord, NC (US); Kaiss K. Alahmady, Plano, TX (US); Daniel Jacob Abreu, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 18/422,163

(22) Filed: Jan. 25, 2024

(65) Prior Publication Data

US 2025/0247669 A1 Jul. 31, 2025

(51) Int. Cl.
*H04W 4/02* (2018.01)
*H04W 4/029* (2018.01)

(52) U.S. Cl.
CPC ........... *H04W 4/029* (2018.02); *H04W 4/023* (2013.01)

(58) Field of Classification Search
CPC .............................. H04W 4/023; H04W 4/029
USPC ....................................................... 455/456.1
See application file for complete search history.

(56) References Cited

U.S. PATENT DOCUMENTS

| | | | | |
|---|---|---|---|---|
| 11,864,153 B1 * | 1/2024 | Yoon | H04W 4/025 | |
| 12,279,178 B2 * | 4/2025 | Chen | H04W 16/28 | |
| 2013/0178235 A1 * | 7/2013 | Chen | G01S 5/12 | 455/456.5 |
| 2014/0128094 A1 * | 5/2014 | Olson | G01S 5/02 | 455/456.1 |
| 2015/0031393 A1 * | 1/2015 | Post | H04W 4/025 | 455/456.2 |
| 2017/0356979 A1 * | 12/2017 | Georgiou | H04W 4/023 | |
| 2021/0306975 A1 * | 9/2021 | Raghu | H04W 40/248 | |
| 2024/0085514 A1 * | 3/2024 | Peng | G01S 7/006 | |
| 2024/0114315 A1 * | 4/2024 | Shin | H04W 4/023 | |

FOREIGN PATENT DOCUMENTS

| | | | |
|---|---|---|---|
| CN | 117528406 A * | 2/2024 | H04W 4/021 |

* cited by examiner

*Primary Examiner* — Hirdepal Singh

(57) ABSTRACT

In some implementations, the techniques described herein relate to a method including: receiving a set of communication events from a user equipment to a base station; obtaining a set of geocoordinates corresponding to the user equipment; calculating an angular mean for the set of geocoordinates; sorting the set of geocoordinates based on distances between the set of geocoordinates and a location of the base station to generate an ordered list of geocoordinates; calculating a k-th order statistic of the ordered list of geocoordinates; generating a predicted location based on the angular mean and the k-th order statistic; and assigning the predicted location as a current location of the user equipment in a cellular core network.

20 Claims, 5 Drawing Sheets

METHOD AND SYSTEM FOR IMPROVING LOCATION DETERMINATION FOR STATIONARY USER EQUIPMENT IN A CELLULAR NETWORK

BACKGROUND

Many cellular network processes and systems rely on determining the geographic location of a user equipment (UE). Many systems utilize instantaneous determinations of UE locations via Global System for Mobile Communication (GSM) localization. Such approaches yield location estimates with significant margins of error, reducing the use of this data by systems that require high-fidelity location data.

DETAILED DESCRIPTION

Figure 1:
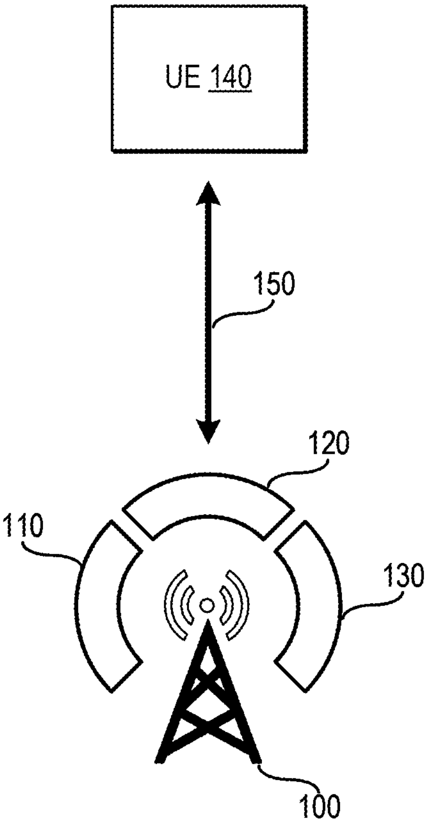
FIG. 1 is a block diagram illustrating a radio area network (RAN) according to some of the disclosed embodiments.

User equipment (UE) regularly communicate with base station (BS) locations independent of the user operating the UE. From the communication parameters associated with these events, a cellular network can infer the latitude and longitude of the user using Global System for Mobile Communication (GSM) localization.

In general, GSM localization can utilize communication parameters of the UE as received by multiple GSM network towers located at known coordinates. The communication parameters may include timing advance, signal strength and the like. By analyzing the timing advance, signal strengths associated with base stations and other communication parameters, an approximate location of the GSM device can be inferred. GSM localization estimates can prove valuable to users, for example, those that are interested in the aggregate daily counts of the number of people visiting points of interest (POIs) such as retail locations, large venues and/or the like.

However, GSM localization suffers from various deficiencies for which there are currently no good technical solutions. Indeed, GSM localization is over an order of magnitude less accurate than Global Positioning System (GPS) localization, and a user's position cannot be narrowed down to a single POI having a small footprint, located among other larger footprint POIs and/or densely populated areas. Furthermore, when a user is stationary, the UE may communicate multiple times with multiple BS devices. Current approaches to localization will only consider the location estimate of the last communication event, while other GSM data is not used to determine the user's current position. In addition, some of the GSM localization measurements might consist of position estimates that are outliers and can bias the user position estimate, thus enforcing the current approach of using the last communication event only. Finally, standard averaging algorithms of valid GSM location data may not utilize the location of the BS devices and the communication parameters which lead to a biased and/or incorrect position averaging. The disclosed embodiments provide technical solutions that solve these and other technical deficiencies in the art of location determination in a cellular network.

Specifically, the disclosed embodiments estimate a cellular network user's location by using multiple GSM localization estimates when the user is identified as stationary, rather than a single measurement as currently performed in cellular networks. The disclosed embodiments can utilize an optimized averaging that is unweighted or weighted based on criteria such as the repeatability of the measurement and the uniqueness of the base stations communicated with. In some implementations, an averaging algorithm can exclude, or more lightly weight, outliers. Alternatively, or in conjunction with the foregoing, an averaging algorithm that incorporates the bias of the communication parameters can be chosen. For example, when timing advance is used to estimate the distance from the tower, it may be more likely that distance to the tower is overestimated rather than underestimated. In some implementations, the chosen averaging algorithm (and the parameters associated with it) can be determined based on a collection of a ground truth locations dataset and identifying the algorithm and parameters that best fit a plurality of GSM localization data.

In some implementations, a first method involves a process aimed at accurately determining the location of a user's equipment within a cellular network when communication parameters of communication events vary. It begins by receiving a series of communication events between the user equipment and a base station. To obtain the user's location with a higher fidelity than previously calculated, a set of geographic coordinates corresponding to the equipment is obtained. Next, the system calculates an angular mean based on these coordinates, providing a central reference point for the location estimate. The obtained coordinates are then sorted based on their distances from the base station's location, generating a list ranging from closest to furthest. The system calculates a k-th order statistic from this ordered list, which can involve selecting a specific value from the list. This value is used for refining the location estimate. Finally, a predicted location is generated by combining the angular mean and the k-th order statistic, and this predicted location is assigned as the current location of the user equipment within the cellular core network.

To acquire the set of geographic coordinates in this method, latitude and longitude values are computed based on various communication parameters associated with the communication events. These parameters include identifiers for the base station, cell, or transmitter, as well as metrics like timing advance, Reference Signal Received Power, and Reference Signal Received Quality. These values can help build a comprehensive picture of the user equipment's geographical position. In the process of calculating the angular mean for the set of coordinates, the latitude and longitude values are converted into polar coordinates, enhancing the accuracy of the mean calculation. When sorting the coordinates based on their distances from the base station, the system arranges them in order from the nearest to the farthest. This ensures that the most relevant data points are considered first for location estimation. In some implementations, the k-th order statistic is derived by selecting a specific value from the ordered list of coordinates. The choice of 'k' can be determined using a ground truth dataset, adding a layer of calibration to the location estimation process.

In a second method, communication events are again received from the user equipment to the base station, and a set of geographic coordinates is obtained. The process starts by computing an average coordinate based on the entire set of coordinates, providing an initial reference point. Subsequently, the coordinates are sorted based on their distances from this average coordinate, generating an ordered list. From this list, a subset of coordinates is selected. A second average coordinate is then calculated based on this selected subset of coordinates. This second average coordinate is considered the current location of the user equipment within the cellular core network. To refine the location estimation further, the subset of coordinates can be weighted. This weighting process employs a monotonic function to assign different levels of significance to individual coordinates within the subset, enhancing the accuracy of the final location estimate.

In some implementations, a system, device and computer-readable medium are also disclosed for performing the above method. In some implementations, methods, systems, devices, and computer-readable media are also provided for determining which algorithm to use based on, for example, whether communication parameters are changing for a given UE.

FIG. 1 is a block diagram illustrating a radio area network (RAN) according to some of the disclosed embodiments.

In the illustrated implementation, an estimate of the location of a UE based on a single communication event is illustrated. Specifically, when a UE 140 communicates with a cell tower 100, the cell tower identity (and thus its location) is known. Thus, at an initial level, the system can identify the UE as being within the vicinity of a cell tower's known location.

As illustrated, cell tower 100 may have at least three receivers (receiver 110, receiver 120, and receiver 130). In some implementations, these receivers may be oriented 120 degrees with respect to each other. In some implementations, the UE 140 may connect to the receiver (e.g., receiver 120) best oriented in its direction. Thus, the system can next place the UE 140 in the direction that the receiver (e.g., receiver 120) is oriented.

In some implementations, cell towers can communicate with multiple user devices on a shared frequency. The time slots of the user communications may be allocated to prevent simultaneous access of resources. Thus, in some implementations, a timing advance (TA) 150 value corresponds to the time a signal takes to transmit from the user device to the cell tower 100 and needs to be part of the resource allocation. Multiplying the TA by the speed of light converts this quantity into a distance. Thus, in some implementations, the timing advance can be used to estimate the distance of the UE 140 from the cell tower 100. In some implementations, the communication between the UE 140 and the cell tower 100 may be a direct line of sight. However, the signal may also bounce off objects (such as buildings) and the signal will take a longer path. The TA 150 will then be longer than the actual distance between the UE 140 and the cell tower 100.

In some implementations, a primary use of user location estimates can be to provide coverage maps of cell phone service availability in a geographical area such as the US. The precision needed for this application may not be as high as the application to locate a user in a POI. Further, in some use cases, coverage applications may not care if the user is stationary or mobile, and location estimates from single pings are sufficient.

Figure 2:
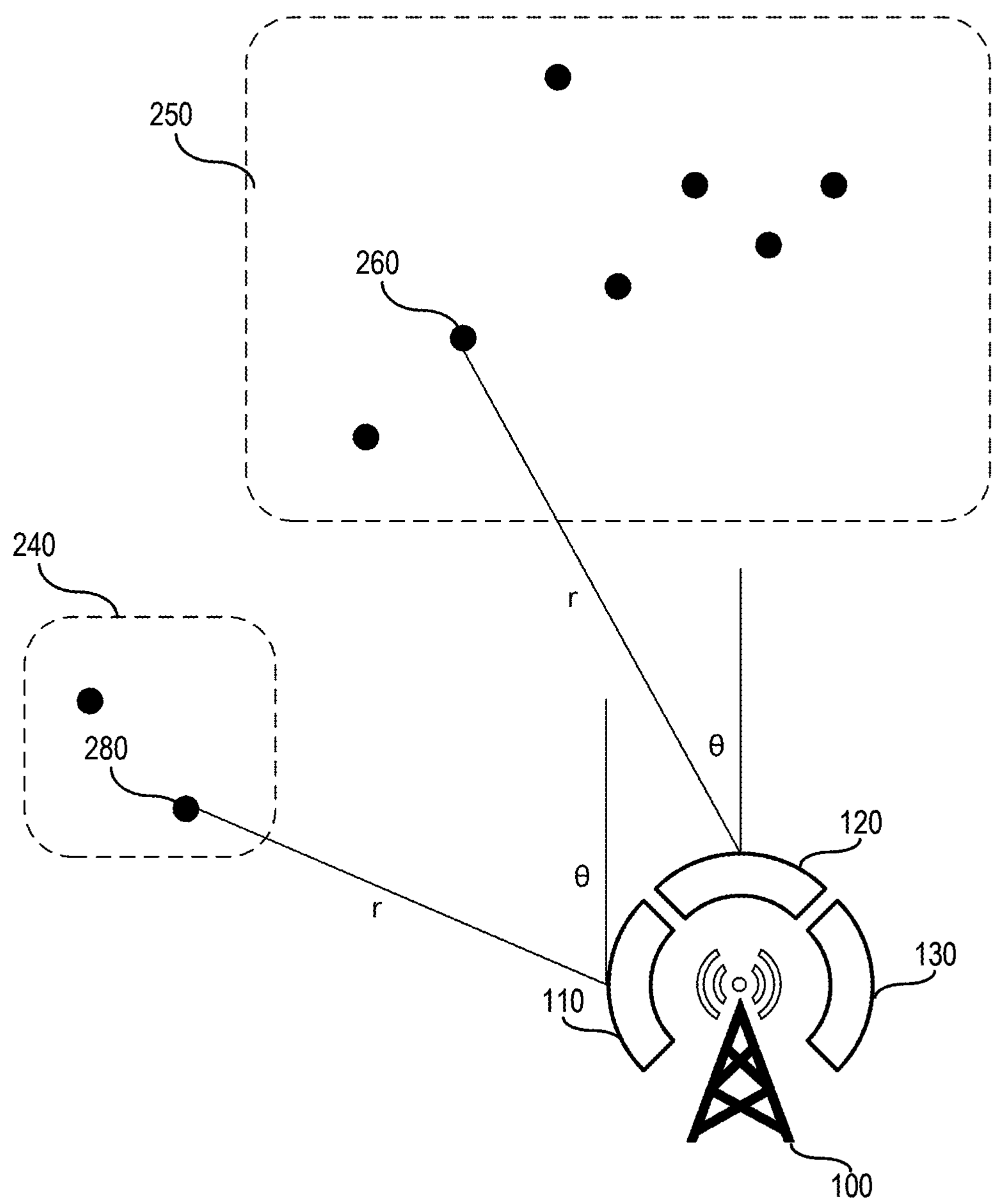
FIG. 2 is a diagram that illustrates the multiple location estimates that are made from multiple communication events between the UE and a radio area network (RAN) system.

FIG. 2 illustrates the multiple location estimates that are made from multiple communication events between the UE and a radio area network (RAN) system that will be used to enhance the accuracy and precision of user location estimation in a radio area network (RAN) system.

In FIG. 2, a scenario in which to deploy an averaging algorithm based on various communication parameters is depicted. As illustrated, cell tower 100 includes three cells or transceivers (receiver 110, receiver 120, and receiver 130). These components are described in the previous figure and not repeated herein. In general, the location estimates (e.g., location estimate 260) are recorded for a single UE.

As illustrated, cell tower 100 communicates with a user device nine times (depicted by the solid circles in region 240 and region 250). Two of these communication events occur through receiver 110 and occur in region 240, and the other seven occur through receiver 120 and occur in region 250. Each of these communication events yields valuable location estimations, denoted as location estimate 260 for receiver 120 and location estimate 280 for receiver 110.

These location estimates encapsulate geographic information, mainly the latitude and longitude coordinates, which can be seamlessly translated into a distance parameter r signifying the distance from the respective cell tower 100. It is noteworthy that r may mirror the timing advance, a metric calculated based on the timing characteristics of the signals exchanged during these communication events. Simultaneously, another key component in determining user location, the azimuthal angle θ with reference to a true north direction is depicted for both location estimates.

To ensure accuracy and precision, the averaging algorithm processes these location estimates from both receiver 110 and receiver 120, leveraging the accumulated data points to derive a more refined and comprehensive understanding of the user's location. By harnessing the rich dataset generated through multiple communication events, this approach enhances the accuracy of location estimation, thereby addressing potential variations arising from signal propagation characteristics and other environmental factors.

Figure 3:
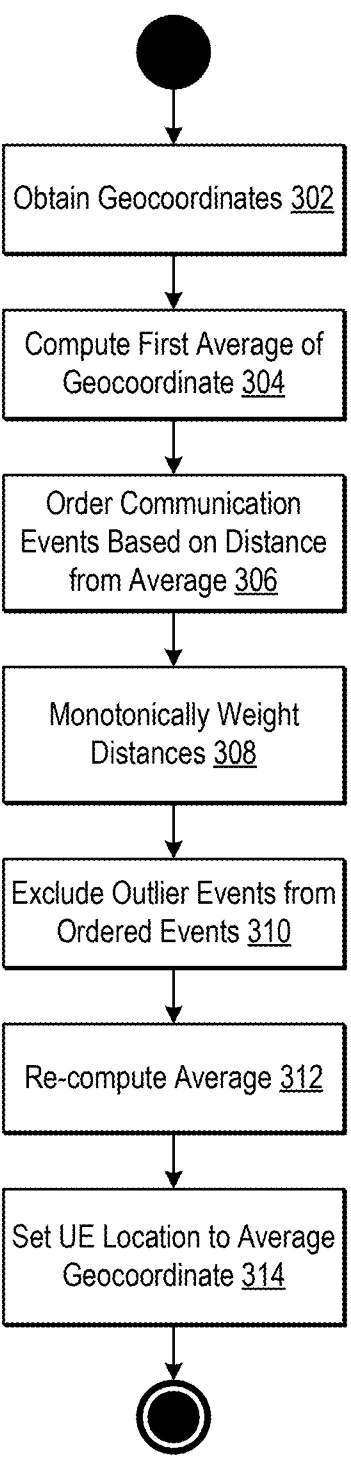
FIG. 3 is a flow diagram illustrating a method for determining the geolocation of a user equipment according to some of the disclosed embodiments.
Figure 4:
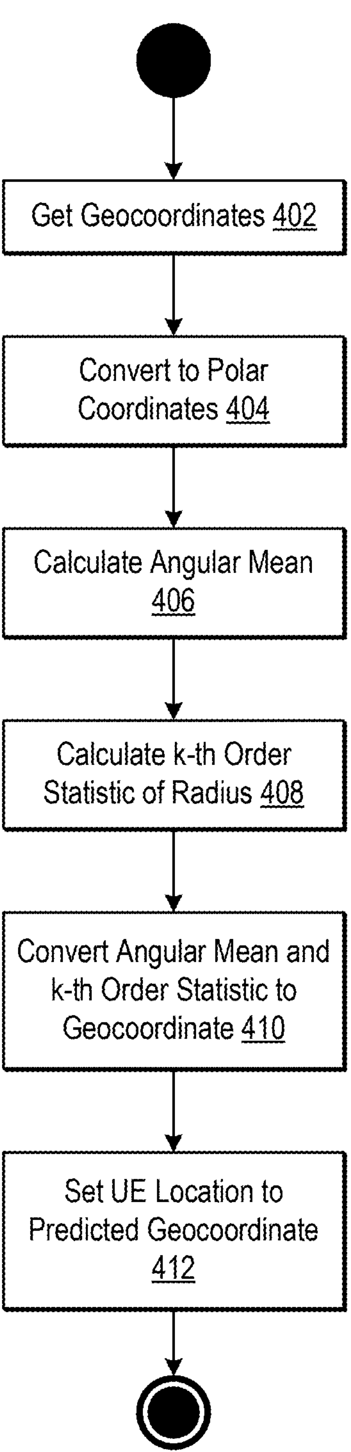
FIG. 4 is a flow diagram illustrating a method for determining the geolocation of a user equipment according to some of the disclosed embodiments.

In some implementations, the method of FIG. 3 and FIG. 4 may be chosen between or, in other implementations, combined. For example, a cellular network may first apply the method of FIG. 4 individually to region 240 and region 250 to obtain two location estimates. Next, the cellular network may perform the method of FIG. 3 using those two location estimates as input geocoordinates. Details of these algorithms are described herein.

FIG. 3 is a flow diagram illustrating a method for determining the geolocation of a user equipment according to some of the disclosed embodiments.

In step 302, the method can include obtaining coordinates of a UE.

In some implementations, the UE can comprise a mobile device such as a mobile phone, tablet, laptop computing device, a tracking device attached to a vehicle, etc. In some implementations, the UE processed using the method may be relatively stationary. In some implementations, a stationary UE may comprise a UE that is not travelling significant distances. For example, a stationary UE may comprise a mobile phone that is placed on a surface. However, a UE may also be moving small distances and still be classified as stationary. For example, a mobile phone in a user's pocket while they shop at a retail location (store, mall, etc.) or move around a household may still be considered stationary. By contrast, a UE in a vehicle traveling on a roadway may be considered a non-stationary UE. In some implementations, the classification of a UE as either non-stationary or stationary may be performed by a preceding process which is not described herein. Indeed, for purposes of FIG. 3, it can be presumed that a stationary UE is selected for further analysis and the specific details on how to classify a UE as stationary or non-stationary in view of the discussion above is not limiting.

In some implementations, step 302 can include receiving or estimating a set of latitudes and longitudes for multiple communication events of a UE.

As used herein, a communication event refers to a communication event detected by a base station with respect to a UE. In some implementations, communication events may be detected during a time period in which a UE is classified as stationary. In some implementations, this window can thus be associated with one or more communication events. In some implementations, each of the communication event may be associated with a geocoordinate (e.g., a latitude and longitude).

In other implementations, however, the communication events may instead be associated with raw communication parameters in which a geocoordinate can be derived. For example, each communication event may be associated with an identifier of a base station (e.g., eNodeB, gNodeB, etc.), a cell or transmitter identifier, a timing advance value, a Reference Signal Received Power (RSRP) value, a Reference Signal Received Quality (RSRQ) value, etc. From these raw parameters, the method can compute an estimated geocoordinate for each communication event. Details of how to estimate a geocoordinate based on raw communication parameters are described above and not repeated herein.

Thus, in step 302, the method can receive or derive a set of geocoordinates for a given UE that is classified as stationary by a cellular network.

In step 304, the method can include computing a first average of the location estimates associated with communication events.

As discussed, in some implementations, a set of communication events rather than a communication event is available to estimate a stationary UE's location. In one implementation, the method can thus use and/or generate an aggregate representation of the UE's position, such as the mean of the latitude and the longitude as an improved estimate of the user position. Thus, in some implementations, step 304 can comprise computing an average geocoordinate (e.g., average latitude, average latitude etc.). For position estimates that are normally distributed with an unbiased measurement error, the mean is generally more accurate compared to a position estimate from a single communication event. However, even for biased measurements, the mean gives a more accurate position estimate than single-communication event location determination.

In some implementations, a UE may communicate multiple times with the same base station and transceiver, but all the communication parameters remain the same or sufficiently similar (i.e., within a threshold tolerance of an identical value). Thus, the estimate (e.g., average) of the UE's latitude and longitude will necessarily also be reported as the same. If each of these communication events is counted as a separate event of equal weight, then it lessens the contribution of additional location estimates if the UE connects to different base stations, or the timing advance and signal strengths change. In this situation, one can lower the weights of the contribution of location estimates that are the same or even consider only unique location estimates.

The following steps address these issues and improve upon a mere aggregate (e.g., average) of recorded geocoordinates. In brief, the following steps provide a generalization of a trimmed mean to two dimensions as well as increasing the weight of communication events that are closer to the mean position (referred to as the distance weighted mean).

In step 306, the method can include ordering or sorting communication events based on their distance from the average geocoordinate computed in step 304.

In some implementations, the method can first sort the geocoordinates of the UE based on the distances between each communication event (as represented by the geocoordinates obtained in step 302) and the average geocoordinate computed in step 304 to generate a ordering of communications events based on their geographical distance from the mean.

In step 308, the method can include monotonically weighting the distances of the communication events from the average geocoordinate computed in step 304.

In some implementations, the method can utilize a monotonic function that decreases as a function as distance. Thus, in some implementations, this function can weigh the communication event closest to the base station highest and monotonically decrease the weight for each further communication event. Other monotonic functions (e.g., decay functions) may also be used. In some implementations, the method can multiply a default weight of a communication event by the value of the monotonic function.

In step 310, the method can include excluding outlier communication events from the ordered communication events. In some implementations, the method can include only a fixed number of communication events from all the communication events that occurred when the UE was stationary. In some implementations, this fixed number can be tunable via a ground truth selection process. In some implementations, the fixed value can comprise an integer value (e.g., "25") or a percentage of the number of the communication events dataset (e.g., "45%). In step 310, the method selects the top communication events nearest to the average location estimate based on this fixed number. In another implementation, the method can include only a fixed number of communication events and exclude communication events that exceed a distance threshold from the average location estimate.

In step 312, the method can include re-computing the average geocoordinate. In some implementations, this can be done in the same manner as described in step 304, albeit with a smaller input size. The details of computing the average of a set of geocoordinates is not repeated herein for the sake of clarity.

In step 314, the method can include setting the UE location to the average geocoordinate.

In some implementations, the setting of the UE location involves a series of steps that update the cellular network's understanding and record of the UE's position and allows for more accurate usage of UE location in downstream processes upon setting the UE location using the methods above (and described herein). This process not only enhances the accuracy of the UE's location within the network but also enables a variety of downstream applications and services that rely on precise location data. Upon generating the predicted geocoordinate, the method involves updating the cellular network's databases with this new information. This update ensures that the network's internal systems, such as those involved in managing calls, messages, and data sessions, have the most current and accurate location information for the UE. The update process typically involves communication between the UE and the network's core systems, facilitated through base stations or cell towers. This ensures that the location information is consistently synchronized across the network's architecture. Further detail on setting a UE location and the benefits of doing so are described more fully in the description of step 412.

FIG. 4 is a flow diagram illustrating a method for determining the geolocation of a user equipment according to some of the disclosed embodiments.

In step 402, the method can include obtaining coordinates of a UE. Details of obtaining the coordinates of a UE are described more fully in the description of step 302, the details of which are incorporated by reference in their entirety and not repeated herein.

In step 404, the method can include converting each of the geocoordinates to polar coordinates. In some implementations, a given polar coordinate includes a radius distance ($r_i$) from a fixed position and an angle ($\theta_i$) relative to a reference direction.

In some implementations, the fixed position can be the location of the base station associated with a communication event. As described above, each communication event is associated with a base station. In some implementations, the method can query a database of base station locations to obtain a geocoordinate of the base station associated with the communication event and use this base station geocoordinate as the fixed position. Then, the distance ($r_i$) can be computed as the distance between the communication event geocoordinates and the base station geocoordinates. Various formulate can be used to compute this distance ($r_i$) such as a Haversine formula, geodesic distance, etc. or simpler formulae (given the small ranges of distances) such as Euclidean distance.

In some implementations, the reference direction can be a constant direction. For example, the reference direction can be true north, magnetic north, etc. The specific direction is not limiting. Based on this reference direction, step 404 can include calculating the bearing or azimuth from the reference direction to the radius between the communication event and the fixed position.

In step 406, the method can include calculating the angular mean (also referred to as the circular mean) of the polar coordinates for each of the communication events.

In some implementations, the angular mean can be used due to situations in which the communication event locations are north of the base station, as there may be some angles that are just east of north and near zero, while other angles are just west of north and near 360 degrees. In some implementations, the computation of the angular mean can comprise computing the arithmetic mean of the sines and cosines of the angles ($\theta_i$) computed in step 404 and the converting the result back to an angle. Specifically, for each angle $\theta_i$, the sine ($\sin \theta_i$) and cosine ($\cos \theta_i$) are calculated. These values correspond to the y and x coordinates, respectively, on a unit circle for the angle $\theta_i$. An arithmetic mean can then be computed separately for these sets of sine and cosine values. This can include summing up all the sine values and dividing by the total number of angles, and similarly summing all the cosine values and dividing by the number of angles. These operations result in two mean values: the mean sine ($mean_{sin}$) and the mean cosine ($mean_{cos}$). In some implementations, the method can convert the averaged sine and cosine values via an arctangent function (e.g., a four-quadrant arctangent (atan 2)) on the mean sine and cosine values. In some implementations, an atan 2 function is used instead of a regular arctangent function to ensure the correct quadrant of the resulting angle is identified.

In step 408, the method can include calculating a k-th order statistic of the radii of the polar coordinates. In some implementations, the use of the k-th order statistic is rooted in about the distances (radii) in these communication events. Specifically, it's more likely that the distance represented by the timing advance (e.g., radius rt) is greater than the actual separation between the UE and base station. This implies a tendency for overestimation of distance. Conversely, it's less likely that the UE is closer than this separation. Thus, using the k-th order statistic helps in accounting for this bias.

In some implementations, this process can involve the following steps.

In some implementations, the method can first sort the geocoordinates of the UE based on the radii computed in step 404. In some implementations, the method can order the geocoordinates from the smallest radius to the largest radius. After sorting the geocoordinates based on radii, the method selects the k-th order statistic from the sorted list. In general, order statistics involve arranging data in ascending or descending order and then selecting the k-th value in this sequence. In step 408, the radii are ordered from smallest to largest, and then the k-th radius in this ordered list is selected.

In some implementations, the value of k can be determined based on the number of communication events between the user device and each cell tower. Since the number of communication events may vary for each cell, k can be chosen as the closest integer to a fraction (f) of the number of these events. This fraction, f, represents a proportion of the total communication events. In some implementations, the fraction f, which determines k, is not arbitrarily chosen. It is optimized by comparing the determined positions with a known ground truth. As will be discussed in more detail after step 412, this optimization process ensures that the selected fraction f leads to the most accurate positional estimations.

In step 410, the method can include converting the angular mean and k-th order statistic to a geocoordinate.

As discussed in the previous two steps, the method computes an angular value (the mean) in step 406 and selects the k-other statistic of the radii in step 408. As such, in step 410, the method obtains a radius ($r_k$) and angle ($\theta_{mean}$) representing a predicted polar coordinate. It should be noted that unlike the radius, the mean angle $\theta_{mean}$ does not exhibit the bias affecting radius values (as discussed previously).

From these values, the method can convert the predicted polar coordinate to a geocoordinate for the UE. In some implementations, standard techniques for computing the latitude and longitude of polar coordinates relative to a fixed position (e.g., base station) can be used and are not described herein for the sake of brevity.

In step 412, the method can include setting a UE location to the predicted geocoordinate generated in step 410.

In some implementations, the setting of the UE location involves a series of integrated actions and systems that update the cellular network's understanding and record of the UE's position. This process not only enhances the accuracy of the UE's location within the network but also enables a variety of downstream applications and services that rely on precise location data. Upon generating the predicted geocoordinate, the method involves updating the cellular network's databases with this new information. This update ensures that the network's internal systems, such as those involved in managing calls, messages, and data sessions, have the most current and accurate location information for the UE. The update process typically involves communication between the UE and the network's core systems, facilitated through base stations or cell towers. This ensures that the location information is consistently synchronized across the network's architecture.

The accurate setting of the UE location significantly improves the quality and reliability of location-based services offered by the network. These services range from basic functionalities like routing calls and messages to more complex applications like emergency services response (e.g., E911 in the United States). Beyond traditional network services, the updated location information enables context-aware services. These services adjust their functionality based on the UE's location, providing personalized content, location-specific recommendations, and enhanced user experiences. The following provides some non-limiting examples of location-based services that may be provided using an accurate stationary position of a UE.

In some implementations, the cellular network can generate location-based analytics. Such networks can aggregate and analyze stationary UE location data to provide clients with volumes of Point-of-Interest (POI) visits based solely on cellular network data. Thus, such a technique does not rely on tracking applications or other third-party tools and can leverage POI tracking using only cellular communications parameters.

As another example, by combining position estimates with other data, clients like banking institutions can generate forward-looking estimates of sales and performance. As one example, this may be particularly useful ahead of quarterly earnings reports, providing a more dynamic and data-driven approach to understanding market trends and consumer behaviors. As another example, the aggregated predicted geocoordinate data can inform recommendations on stock buys, credit issuance, and business loans. By understanding the movement and concentration of consumers, financial institutions can make more informed decisions about where to invest, whom to lend to, and which markets or sectors are likely to be profitable.

As another example, in the event of natural disasters like earthquakes or floods, accurately setting UE locations (especially for stationary UEs) can be used for rescue and relief operations. Emergency services can quickly locate and prioritize areas where people are stranded or in need of assistance. Similarly, law enforcement agencies can use this data to enhance public safety measures, monitor high-risk areas, and respond more effectively to incidents.

As another example, during health crises like pandemics, precise location data can help track the spread of diseases. This information is vital for implementing targeted containment measures and resource allocation. For mobile healthcare services, especially in rural or underserved areas, accurate UE location setting can optimize routes and ensure timely delivery of medical services.

The foregoing are merely some examples of uses of more accurate location data (as compared to GSM location estimates) obtained using the processes described herein. As discussed previously, the applications are achievable solely through communications parameters intrinsic to the cellular network and require no action from the UEs analyzed, thus allowing for widespread adoption of the technique across a cellular network.

Although the averaging algorithms described above in FIG. 3 and FIG. 4 are grounded in how UEs communicate with base stations, the complexity and noise in the communication prevents one from identifying the best approach without additional information. Thus, in some implementations, a measure of a ground truth can be used to identify the best averaging algorithm and the parameters of the averaging algorithm. In some implementations, this ground truth can be identified by users manually or automatically logging the location where they actually are when a communication event is received.

In some implementations, a ground truth dataset consists of one or more users logging where they are stationary at or some other location with a known latitude and longitude for some fixed amount of time. Alternatively, or in conjunction with the foregoing, the dataset can consist of logging based on non-user initiated action executed (e.g., from a drone's flight in the subject areas of interest or tagging devices attached to vehicles). In some implementations, such logging can be accomplished with one or more users carrying a GPS tracking device and processing the raw GPS logs. In other implementations, the logging can also be accomplished by the users logging which POIs they have visited, the approximate time, and then using mapping software, looking up the latitude and longitude of these POIs. Alternatively, or in conjunction with the foregoing, the dataset can be obtained from GPS level data from UE applications that require it, such as map applications (e.g., GOOGLE MAPS®, WAZE® etc.).

In some implementations, from the ground truth dataset a set of start times, end times, and ground truth locations can be analyzed. For each start/end time pair, a plurality of communication events can be extracted from a communication event database, particularly the location of the base stations and cellular received communicated with and the location estimations (computed using the illustrated method).

In some implementations, the averaged measured user location is calculated from each of the algorithms in FIG. 3 and FIG. 4. The distance error between the measured location and the true location can then be calculated for each of the algorithms. An error metric, such as the root mean square error (RMSE) or the median of the distance errors, can be calculated for each of the algorithms. For algorithms with adjustable parameters, the error metric can be calculated for selected values of the parameters. The algorithm which provides the minimum error metric will be the preferred algorithm for the location estimation calculation.

The logging of the ground truth can be comprehensive or non-comprehensive. In a comprehensive ground truth, the start time, duration, and location where users are stationary over a given date range is logged. In a noncomprehensive ground truth, only a subset of this information is logged. A noncomprehensive ground truth is satisfactory to optimize the averaging algorithm and parameters however it should be noted that given this level of data, one may only be able to evaluate the true-positive performance of the algorithms whereas having a comprehensive ground truth would allow one to produce a full confusion matrix in order to accurately measure performance.

Figure 5:
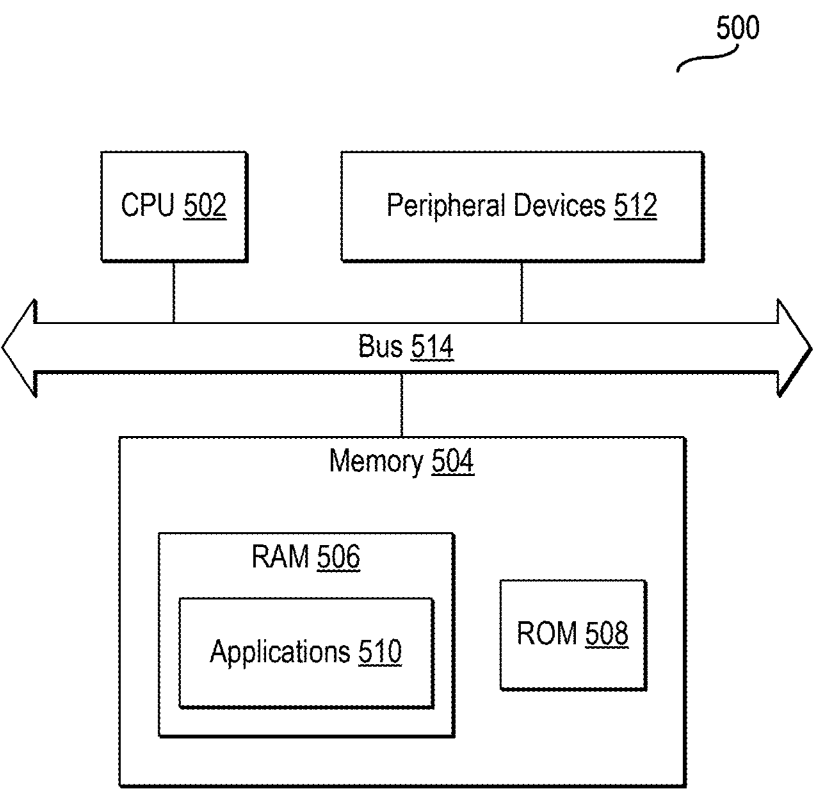
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

receiving a set of communication events from a user equipment to a base station;

obtaining a set of geocoordinates corresponding to the user equipment;

calculating an angular mean for the set of geocoordinates;

sorting the set of geocoordinates based on distances between the set of geocoordinates and a location of the base station to generate an ordered list of geocoordinates;

calculating a k-th order statistic of the ordered list of geocoordinates;

generating a predicted location based on the angular mean and the k-th order statistic; and assigning the predicted location as a current location of the user equipment in a cellular core network.

2. The method of claim 1, wherein obtaining the set of geocoordinates comprises computing latitude values and longitude values for the set of communication events based on at least one communication parameter associated with the set of communication events.

3. The method of claim 2, wherein the at least one communication parameter comprises one or more of an identifier of a base station, a cell or transmitter identifier, a timing advance value, a Reference Signal Received Power value, and a Reference Signal Received Quality value.

4. The method of claim 2, wherein calculating an angular mean for the set of geocoordinates comprises the latitude values and longitude values into a set of polar coordinates.

5. The method of claim 1, wherein sorting the set of geocoordinates based on the distances between the set of geocoordinates and the location of the base station comprises ordering the set of geocoordinates from closest to furthest from the location of the base station.

6. The method of claim 1, wherein calculating the k-th order statistic comprises selecting a k-the value from the ordered list of geocoordinates.

7. The method of claim 6, further comprising determining a value of k for the k-th order statistic using a ground truth dataset.

8. A method comprising:

receiving a set of communication events from a user equipment to a base station, wherein the user equipment is classified as stationary;

obtaining a set of geocoordinates corresponding to the user equipment, wherein each geocoordinate of the set of geocoordinates is a location estimate derived from at least one communication parameter of a respective communication event of the set of communication events, and wherein communication parameters of the set of communication events are unchanging;

computing an average geocoordinate based on the set of geocoordinates;

sorting the set of geocoordinates based on distances between the set of geocoordinates and the average geocoordinate to generate an ordered list of geocoordinates;

selecting a subset of the ordered list of geocoordinates, wherein the subset excludes geocoordinates that exceed a distance threshold from the average geocoordinate;

computing a second average geocoordinate based on the subset of the ordered list of geocoordinates; and assigning the second average geocoordinate as a current location of the user equipment in a cellular core network.

9. The method of claim 8, further comprising weighting the subset of the ordered list of geocoordinates.

10. The method of claim 9, wherein weighting the subset of the ordered list of geocoordinates comprises weighting the subset of the ordered list of geocoordinates using a monotonic function.

11. A device comprising:

a processor configured to:

receive a set of communication events from a user equipment to a base station;

obtain a set of geocoordinates corresponding to the user equipment;

calculate an angular mean for the set of geocoordinates;

sort the set of geocoordinates based on distances between the set of geocoordinates and a location of the base station to generate an ordered list of geocoordinates;

calculate a k-th order statistic of the ordered list of geocoordinates;

generate a predicted location based on the angular mean and the k-th order statistic; and assign the predicted location as a current location of the user equipment in a cellular core network.

12. The device of claim 11, wherein obtaining the set of geocoordinates comprises computing latitude values and longitude values for the set of communication events based on at least one communication parameter associated with the set of communication events.

13. The device of claim 12, wherein the at least one communication parameter comprises one or more of an identifier of a base station, a cell or transmitter identifier, a timing advance value, a Reference Signal Received Power value, and a Reference Signal Received Quality value.

14. The device of claim 12, wherein calculating an angular mean for the set of geocoordinates comprises the latitude values and longitude values into a set of polar coordinates.

15. The device of claim 11, wherein sorting the set of geocoordinates based on the distances between the set of geocoordinates and the location of the base station comprises ordering the set of geocoordinates from closest to furthest from the location of the base station.

16. The device of claim 11, wherein calculating the k-th order statistic comprises selecting a k-the value from the ordered list of geocoordinates.

17. The device of claim 16, wherein the processor is further configured to determine a value of k for the k-th order statistic using a ground truth dataset.

18. The device of claim 11, wherein the processor is further configured to determine if communication parameters of the set of communication events are unchanging and, in response:

compute an average geocoordinate based on the set of geocoordinates;

sort the set of geocoordinates based on distances between the set of geocoordinates and the average geocoordinate to generate an ordered list of geocoordinates;

select a subset of the ordered list of geocoordinates;

compute a second average geocoordinate based on the subset of the ordered list of geocoordinates; and assign the second average geocoordinate as a current location of the user equipment in a cellular core network.

19. The device of claim 18, further comprising weighting the subset of the ordered list of geocoordinates.

20. The device of claim 19, wherein weighting the subset of the ordered list of geocoordinates comprises weighting the subset of the ordered list of geocoordinates using a monotonic function.

* * * * *